United States Patent
Umarov et al.

(10) Patent No.: US 9,562,197 B2
(45) Date of Patent: Feb. 7, 2017

(54) METHOD FOR PROCESSING OF LIQUID HYDROCARBON RAW MATERIALS

(71) Applicant: SOLARIS HOLDINGS LIMITED, St. Helier (GB)

(72) Inventors: Georgy Ramasanovich Umarov, Moscow (RU); Sergey Ivanovich Boychenko, Moscow (RU); Shiv Vikram Khemka, Sachseln (CH)

(73) Assignee: Solaris Holdings Limited, St. Helier, Jersey, Channel Islands (GB)

( * ) Notice: Subject to any disclaimer, the term of this patent is extended or adjusted under 35 U.S.C. 154(b) by 0 days.

(21) Appl. No.: 14/363,158

(22) PCT Filed: Nov. 15, 2012

(86) PCT No.: PCT/IB2012/002611
§ 371 (c)(1),
(2) Date: Jun. 5, 2014

(87) PCT Pub. No.: WO2013/084051
PCT Pub. Date: Jun. 13, 2013

(65) Prior Publication Data
US 2015/0041367 A1  Feb. 12, 2015

(30) Foreign Application Priority Data
Dec. 7, 2011 (GB) .................................. 1121190.1

(51) Int. Cl.
*C10G 7/00* (2006.01)
*B01D 17/02* (2006.01)
*B01J 19/18* (2006.01)

(52) U.S. Cl.
CPC .............. *C10G 7/00* (2013.01); *B01D 17/0217* (2013.01); *B01J 19/1831* (2013.01)

(58) Field of Classification Search
CPC ..... C10G 7/00; B01J 19/1831; B01D 17/0217
See application file for complete search history.

(56) References Cited

U.S. PATENT DOCUMENTS 3,966,582 A    6/1976   Cramer

FOREIGN PATENT DOCUMENTS

| JP | 2009529406 A | 8/2009 |
|---|---|---|
| WO | 2007104952 A2 | 9/2007 |

OTHER PUBLICATIONS

International Search Report under date of Mar. 19, 2013 in connection with PCT/IB2012/002611.

(Continued)

*Primary Examiner* — Randy Boyer
*Assistant Examiner* — Juan Valencia
(74) *Attorney, Agent, or Firm* — Quarles & Brady LLP

(57) ABSTRACT

The invention pertains to a method for processing of liquid hydrocarbon raw materials. The method includes preliminary pretreatment of a flow of raw materials and further processing with fractionation. The pretreatment is performed by forming a primary flow of liquid hydrocarbon with the characteristics of a straight tubular laminar flow and then directing that flow through a spiral tubing at a velocity the maximal value of which maintains laminarity of the laminar primary flow through the spiral tubing. The laminary primary flow is fractionated following the pretreatment. The invention has applications to the field of petroleum processing and may find application in the petroleum and petrochemical industries, and in the field of fuel power engineering.

4 Claims, 1 Drawing Sheet

(56) References Cited

OTHER PUBLICATIONS

Figures 1, 2:
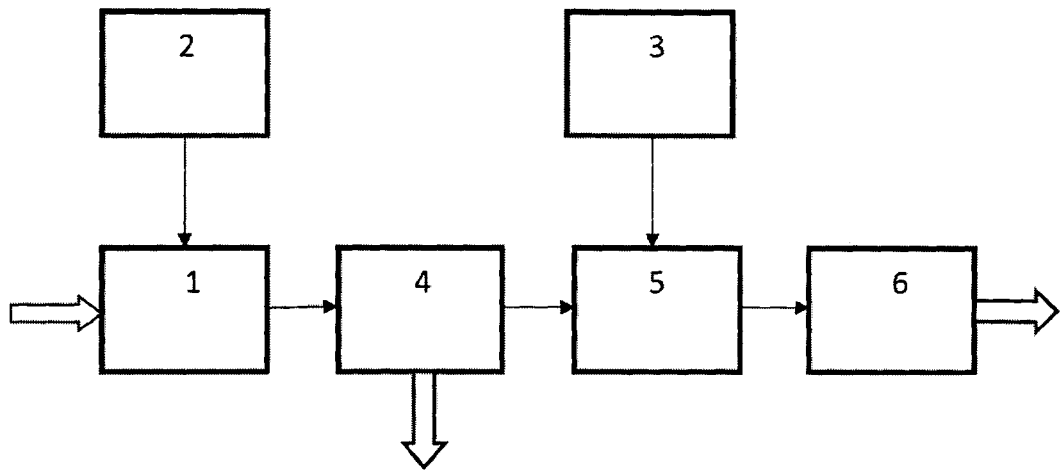

Search Report under date of Mar. 27, 2012, in connection with GB1121190.1.
Dali Yang et al, Light hydrocarbon distillation using hollow fibers as structured packings, Journal of Membrane Science 362 (2010) 86-96, 6 pages.
Akhiezer, et al., Quantum Electrodynamics, Moscow, Nauka, 1969.
Japan Patent Office, Notice of Reasons for Rejection, Application No. 2014-545379, Sep. 13, 2016.

| The limits of selection physicochemical parameters | Fractional yield wt % of crude | |
|---|---|---|
| | crude oil | oil processed under the claimed method |
| overpoint, °C | 68 | 46 |
| to 200°C | 10,6 | 31,4 |
| to 250°C | 15,1 | 42,9 |
| to 300°C | 22,2 | 56,2 |
| to 350°C | 29,9 | 67,2 |
| density, kg/m | 941,2 | 795,7 |
| kinematic viscosity, cSt at 20 °C | 87,9 | 1,3 |
| sulphur content, wt % | 5,0 | 1,5 |
| chlorides content, mg/l | 2000 | 50 |

METHOD FOR PROCESSING OF LIQUID HYDROCARBON RAW MATERIALS

CROSS-REFERENCE TO RELATED APPLICATIONS

This application represents the national stage entry of PCT International Application No. PCT/IB2012/002611 filed Nov. 15, 2012, which claims priority of Great Britain Patent Application No. 1121190.1, filed Dec. 7, 2011, the disclosures of which are incorporated by reference here in their entirety for all purposes.

TECHNICAL FIELD

The invention pertains to the field of petroleum processing and may find application in petroleum and petrochemical industries, in field of fuel power engineering.

BACKGROUND ART

Treatment of crude oil for refinery (in particular crude oil which has complicated rheological structure) is a process that determines profitability of the whole petrochemical industry.

Upon availability of treatment (pre-processing of crude oil before feeding to the reactor for refining) the subsequent processing of oil raw materials requires much less time, thus increasing the productivity of the process.

Pre-processing of crude oil is performed with the following purposes:
  desalting and dehydration,
  viscosity reduction of oil and petroleum products (improvement of rheological properties),
  removing sulfur and sulfur compounds from crude oil.

It was developed some methods of pre-processing of crude oil focused on partial modifications in the structure of hydrocarbon links in order to, in addition to the above, as far as possible to increase the yield of light ends on the earliest stages.

There is a method (RU 2158288, 27 Oct. 2000), under which crude oil before feeding to the column for refinery is exposed to complex hydro mechanical and acoustic treatment in the rotary-pulsating acoustic apparatus in a certain range of velocities in the gap between rotor and stator. As a result of changes in the disperse oil state, the yield of oil distillate fractions increases. Disadvantage of the method is a great energy and metal consumption.

There is a method (U.S. Pat. No. 4,323,448, 6 Apr. 1982), under which mechanical activation of hydrocarbons is carried out by passing them through a disintegrator with exposure of impacts at a given frequency.

There is a method (RU 2122457, 27 Nov. 1998), under which hydrocarbon compounds in a liquid form are placed in an artificial gravity field and supply of mechanical energy to the liquid is provided by means of mechanical elements. Disadvantage of these methods is a great energy and metal consumption.

There is a method of cavitation effect in the processing of different liquids, including for intensification of processing of hydrocarbon raw materials.

Method of patent (KZ 14129, 15 Mar. 2004) is characterized by the fact that, when petroleum passes through cavitator, formation and growth of cavitation bubbles and their subsequent collapse occur, accompanied by shock waves disrupting structure of heavy molecules of hydrocarbons, including paraffin and asphalt-resinous substances.

Gas temperature inside a cavitation bubble at the end of collapse becomes very high, because the process happens so quickly that it's no time to establish heat exchange between contents of the bubble and surrounding liquid. Hot gas contacting heavy molecules, heats them up to the temperature at which strength of links between atoms decreases and molecules are disintegrated to more simple compounds. At disintegration of paraffin molecules more simple hydrocarbons, light fractions, are formed (paraffin content is reduced due to disintegration of its molecules). Asphalt-resinous substances content decreases due to their dissolution by the formed light fractions.

However, using of petroleum raw materials of different chemical and fractional composition, different viscosity and other physical and chemical characteristics, for some of them the cavitation mechanism can not be realized and in this case the mechanical destruction of these raw materials may not be carried out.

DISCLOSURE OF INVENTION

The announced method involves pretreatment of crude oil and petroleum products before the main process—rectification with formation of light fractions and fractionation.

The object of the invention is to develop high-performance, energy-efficient technology for processing of both light and heavy crude oil and petroleum products, such as high-paraffin crude oil and oils with a high content of resins and asphaltenes.

The technical result which this invention is aimed at consists in quality improvement of processed liquid hydrocarbon raw materials and intensity increase of its treatment while reducing energy costs.

The technical result is achieved by a method for processing of liquid hydrocarbon raw materials which includes preliminary pretreatment of raw materials flow and further processing with fractionation, which is different that the pretreatment is performed by means of forming of the primary flow with characteristics of a straight tubular laminar flow, whereupon the raw materials flow is forced into directed progressive rotary motion preserving laminarity, for this purpose it is directed to a spiral tubing while the primary flow is forced to move at a velocity the maximal value of which on the boundary of vortex axile zone satisfies the conditions of achievement by the Reynolds number of critical values for tubular spiral flow of liquid.

The mentioned velocity can be provided by regulated dynamic pressure of raw material primary flow.

For large volumes of pretreatment oil more than one primary flow can be formed.

The directed motion of the flow along vortex trajectory can be provided by means of pipeline geometry modification.

In the other particular case the directed motion of the flow along vortex trajectory can be provided by means of tangential input of straightforward flow into the vortex zone.

The dynamic pressure volume is preserved in its natural fluctuation limits.

Maintaining accuracy of the dynamic pressure values is provided within limits of its natural fluctuations.

Previously formed primary flow is evenly divided into parallel streams through hydro dynamically separated channels.

Additionally it should be noted that the features included in the dependent claims are used in particular cases of the method implementation.

The laws of hydrodynamics, in particular, the laws describing regimes of motion of viscous fluids, which include the flow of hydrocarbons, are laid in the basis of the method announced.

It is known that motion of a viscous fluid can be performed in two regimes: laminar, characterized by steady-layered fluid motion with no mixing of particles and turbulent, in which the fluid particles, in addition to progressive motion have rotational motion.

Regimes differ by different intensities of heat and mass transfer processes. It is believed that laminar regime of pipeline operation is the most profitable in energy terms. Comparison of pressure differentials for turbulent and laminar flows (performed on the basis of Poiseuille equation for viscous liquids) shows that increasing fluid pumping velocity through pipes in turbulent flow requires a much greater increase in pressure differential than in laminar. Laminar regime is more effectively transfers heat, besides when turbulent eddy forms the effective hydraulic resistance increases, that is a reason of pressure loss along the length of pipeline. For these reasons, the ability of flow to preserve the laminarity (hydrodynamic stability of a laminar flow regime, resistance to formation of a turbulent flow regime) is an important operational feature of a system transporting and processing hydrocarbons flow (system effectiveness measure).

Hydrodynamic flow regime is characterized by the dimensionless Reynolds number. Variables connected with Reynolds number directly or indirectly are controlling flow parameters and regime change depends on these variables.

$$Re = vL\rho/\eta, \quad (1)$$

where:
- $\rho$—liquid density,
- $v$—flow velocity,
- $L$—characteristic length of flow elements (flow pipe radius),
- $\eta$—coefficient of molecular viscosity.

Regime of transition from laminar to turbulent flow is characterized by a critical value of the Reynolds number. This number, at which eddy formation begins, varies widely subject to not only on the flow velocity, diameter and fluid viscosity, but also additional conditions contributing overcoming of potential barrier of cohesive forces between liquid molecules.

At other known parameters in the equation (1), it can be allocated a transient regime zone, characterized by an interval of flow velocities in the range of nominal values (upper and lower critical velocities).

Transition from laminar to turbulent flow can be considered as a process of self-organization, which takes place in accordance with the laws of phase transition or a sequence of phase transitions in an unstable heterogeneous system, which can be represented by flow of hydrocarbons (a complex mixture of hydrocarbons of different structural-group composition and heteroderivatives with a wide range of physical and chemical properties).

If in the part of hydrocarbon flow it can be achieved a velocity, met the conditions needed for creation of the energy density per unit volume in accordance with the formula:

$$E_n = 2\,mc^2\left(1 + \frac{m}{M}\right), \quad (2)$$

where:
- m—electron mass,
- c—velocity of light in vacuum,
- M—molecule mass in working fluid (hydrocarbons flow).

phase transition under critical regime, is a transition into the fifth (positron) medium state, taking place with release of significant energy being domestic energy resource of the system (A. I. Akhiezer, V. V. Berestetsky "Quantum electrodynamics", Moscow, Nauka, 1969).

The basis of this statement is comprehension of Dirac positron medium state, contained in the monograph P. A. M. Dirac, The Principles of Quantum Mechanics, 1930. The above mentioned impacts on working fluid creates the conditions for quantum-mechanical resonance with the fifth state of Dirac medium, actuating in it polarization processes similar to electron-positron pairs creation. This process is a special case of the first type phase transition and a subject to all laws natural to it.

On the other hand, it's known that vortex motion is characterized by full use of the internal energy of a working body and additional dynamic pressure by means of working medium rotational flow motion in general. In the vortex (as a dynamic non-linear structure) transfer of energy and momentum increases drastically, by orders.

Studies of the hydrodynamic model have shown that the beginning of intensive energy growth in axile zone of the vortex is almost identical with the boundary of instabilities formation in laminar flow.

Based on the foregoing the applicant has made an assumption (subsequently confirmed experimentally) that tubular spiral flow of hydrocarbons can be regarded as vortex-like. Upon condition of preservation of flow in a state corresponding to the critical flow regime, up to the border of the vortex axile zone, and prevention of transition of working fluid laminar flow in tubular flow (in-tube flow) into turbulent flow regime until achievement of this boundary, it is possible without significant energy consumption to provide in the axile zone for micro volume of substance matter constituting the working medium, conditions of phase transition into the fifth state of medium that is accompanied by significant energy release. According to experimental studies fact of the mentioned phase transition was confirmed by accompanying shortwave radiation.

In this context micro volume is a physically small volume in comparison with liquid volume, but it's a large volume in comparison with molecular distance.

For preservation of flow dynamical structure stability at its transition from straightforward to vortex mode, preservation accuracy of flow controlled parameter has the basic significance due to gentle approach to the phase transition mentioned above guarantees the system temporal stability. Some studies devoted to the first type phase transitions show that the transitions are initiated by spontaneous fluctuations of one of thermodynamic system parameters, caused by thermal or quantum-mechanical effects. Since flow velocity supporting by dynamic pressure is the controlled parameter, one can speak about value fluctuations of the last-mentioned. At that pumping system creating required pressure should meet rigid requirements on average value maintenance for the parameter determined fluctuation range. This maintenance may be performed, including, by means of feedback on the parameter controlled.

Energy release in hydrocarbon flow is accompanied by processes analogous to those occurring as a result of cavitation effect, but unlike the last-mentioned, not depending on chemical and fractional composition, viscosity and other chemical-physical characteristics of crude oil. Energy released in the process of phase transition of part of micro objects of working body into the fifth medium state, causes interatomic links strength decrease, in consequence of which hydrocarbons heavy molecules structure is disintegrated, including paraffin and asphalt-resinous substances. As a result of factors complex interaction, oil quality increases and already at this stage partial light fractions separation takes place, which is an indication of processing intensity increasing. Simultaneously flow temperature increase contributes oil and water density difference increasing and liquid fractionation process is facilitated. Water is distributed in the flow evenly dissolving salts contained in it, and it is extracted from heavy residue as a part of steam-and-fluid mixture.

BEST MODE FOR CARRYING OUT THE INVENTION

Example of practical performance of the method announced is illustrated by FIG. 1, where operational diagram of apparatus for liquid hydrocarbon raw materials processing is presented, and effectiveness of the method announced is illustrated by FIG. 2, where data on crude oil and oil processed one time with use of the method announced are presented.

This apparatus consists of reservoir for hydrocarbon raw materials pretreatment 1, pump 2 for creation of raw material dynamic pressure in the chamber, pump 3 for heat-carrying agent supply, evaporator 4 for separation of light oil fractions, mixer 5, and fractionation reactor 6. Moreover the apparatus has different equipment for raw material storage and collection of the products produced (not shown).

Reservoir for pretreatment 1 has a system of hydrodynamically separated channels (tubular units, pipe-lines) in which any flow regime can be maintained. Each tubular unit has straightforward initial part, as far as possible smoothly conjunct with raw material storage wall. It was made with purposes of maximal decrease in hydraulic resistance occurring due to difference in tube and storage sizes and prevention of eddy (turbulence) in this zone.

The straightforward part of pipe-line smoothly transforms into spiral-shaped. This part shape can be determined, in particular, by a three-dimensional curve which projection on the plane orthogonal of vertical axe, is, for example, Archimedean spiral, logarithmic or hyperbolic spirals. Regulated computational form of vortex flow guarantees achievement of significant flow rotation velocity in axile zone wherein formula (2) is true.

Pipe smooth curve is considered the most suitable from the point of view of pressure losses due to absence of dangerous zones of turbulence. However maximal radius of the pipe curve is to be selected on the basis of the condition of achievement of flow velocity critical value on the axile zone boundary, wherein hydrodynamic stability of entering this part flow against possible vortex laminarity violations can be achieved. At that circumferential velocity values regular distribution depending on distance from rotative axis shall be taken into consideration.

Complex of the conditions developed for the process stability supporting being performed for one separate channel (or pipe-line) automatically performs for the whole channel system (or pipe-lines).

Other elements of the apparatus are no different from the known on the technical level.

This method is performed in the following manner.

Hydrocarbon raw materials (oil) are fed into the tank for pretreatment 1 from the storage through pump 2. Pump 2 produces hydrodynamic pressure for providing of flow velocity interval needed for primary flow laminarity supporting. At determining of the velocity interval mentioned above according to formula (1) raw feedstock viscosity and pipe-line geometric configuration parameters are to be taken into consideration. Further the primary flow curls along spiral trajectory with preservation of computational laminarity, which is maintained by regular hydrodynamic pressure of raw materials in intake branch pipe, allowing on the one side to use rotative motion source power in full for vortex flow producing, on the other side, to maintain permanent flow characteristics up to axile vortex zone boundary (as a rule it forms up to half of vortex flow radius). Velocity distribution in the vortex has axisymmetric characteristics with velocity increase up to the maximum value and pressure decreasing down to the minimum in the vortex axile zone, at that from the moment of the vortex formation the law of conservation of momentum starts operating. Features of the vortex, as a dynamic self-organizing structure are such that velocities in the axile zone reaches critical values and there are conditions for necessary phase transition of working fluid microvolume with release of significant energy, contributing intensification of further separation process of hydrocarbons into fractions. In the evaporator 4, where hydrocarbons flow enters from the draining zone of reservoir 1, a partial separation of light hydrocarbons in the form of a gas-vapor mixture from dehydrated heavy component takes place. Further, heavy hydrocarbons, mixed in a mixer 5 with coolant supplied by pump 3, enter the reactor 6 for further refining.

FIG. 2 presents comparative results for separation of light and heavy crude oil residue and oil, refined by the announced method, in percentage of light hydrocarbon fractions to the whole mass. High viscosity materials with high content of resins and asphaltenes were processed.

Refined oil quality evaluation made according to integrated indicator of pipeline oil quality (K), calculated on the basis of the above data by the method described in the study of Degtiarev V. N. «Oil Quality Bank», Oil Industry, 1997, No. 3, p. 62-63 [3], shows oil quality increase in several times. Integrated indicator of refined oil quality was $N_{ref}=0.455$ for initial oil indicator of $K_{in}=2.92$. Downward bias of unit deviation of the Quality integrated indicator leads to falling costs of processing.

INDUSTRIAL APPLICABILITY

The announced method can be used to process both light and heavy crude oil and petroleum products, and allows by means of pretreatment of hydrocarbon flow to improve substantially the quality of the finished product, as well as intensity and energy efficiency of the rectification process.

The invention claimed is:

1. A method for processing liquid hydrocarbon raw materials, said method comprising:
    pretreating liquid hydrocarbon materials by forming a laminar primary flow of the liquid hydrocarbon material with characteristics of a straight tubular laminar flow, and then directing the laminar primary flow through spiral tubing at a velocity, the maximal value of which maintains laminarity of the laminar primary flow through the spiral tubing; and
    fractionating said laminar primary flow following said pretreating.
2. The method according to claim 1, in which the mentioned velocity is provided by regulated dynamic pressure of raw material primary flow.

3. The method according to claim 1, in which more than one primary flow is formed.

4. Method according to claim 2, in which the volume created by the dynamic pressure is preserved in its natural fluctuation limits.

\* \* \* \* \*